United States Patent [19]

Stehning

[11] Patent Number: 4,539,184

[45] Date of Patent: Sep. 3, 1985

[54] SCRUBBER FOR THE DESULFURIZATION OF EXHAUST GASES

[75] Inventor: Werner Stehning, Dorsten, Fed. Rep. of Germany

[73] Assignee: Gottfried Bischoff Bau Kompl. Gasreinigunga- und Wasserruckkuhlanlagen GmbH, Essen, Fed. Rep. of Germany

[21] Appl. No.: 493,984

[22] Filed: May 12, 1983

[30] Foreign Application Priority Data

May 15, 1982 [DE] Fed. Rep. of Germany ....... 3218470

[51] Int. Cl.³ .......................... B01J 10/00; B01J 12/00
[52] U.S. Cl. ........................................ 422/170; 55/223;
55/255; 55/256; 261/116; 261/122; 422/176;
422/189; 422/231; 422/234
[58] Field of Search .................. 261/116, 117, 122;
422/169, 170, 172, 176, 189, 230, 231, 234;
55/223, 255, 256; 432/144, 140, 147; 423/242 A

[56] References Cited

U.S. PATENT DOCUMENTS

| | | | |
|---|---|---|---|
| 1,180,372 | 4/1916 | Breydel | 422/231 |
| 2,889,002 | 6/1959 | Kocee | 422/172 |
| 4,032,300 | 6/1977 | Parker et al. | 422/144 |
| 4,051,069 | 9/1977 | Bunn, Jr. et al. | 422/144 |
| 4,062,759 | 12/1977 | Castagnos, Jr. et al. | 422/144 |
| 4,150,090 | 4/1979 | Murphy et al. | 422/310 |
| 4,201,755 | 5/1980 | Nofal | 423/242 A |

FOREIGN PATENT DOCUMENTS

| | | | |
|---|---|---|---|
| 2928061 | 1/1980 | Fed. Rep. of Germany . | |
| 55-116424 | 9/1980 | Japan | 55/223 |

OTHER PUBLICATIONS

VGB Kraftwerkstechnik, vol. 11, Nov. 1981, pp. 938–944.

Primary Examiner—Michael S. Marcus
Attorney, Agent, or Firm—Karl F. Ross; Herbert Dubno

[57] ABSTRACT

A scrubber for removing sulfur compounds from a gas, particularly a flue gas of a power plant boiler combustion chamber, comprises spray devices for washing the gas with a liquid containing a sulfur compound binding agent. The sump is provided with a partition formed by an array of oxygen ducts which divides the sump into an upper oxidation zone and a lower reaction zone. An additive is introduced into the reaction zone to induce the precipitation of calcium sulfite in the sump product.

12 Claims, 5 Drawing Figures

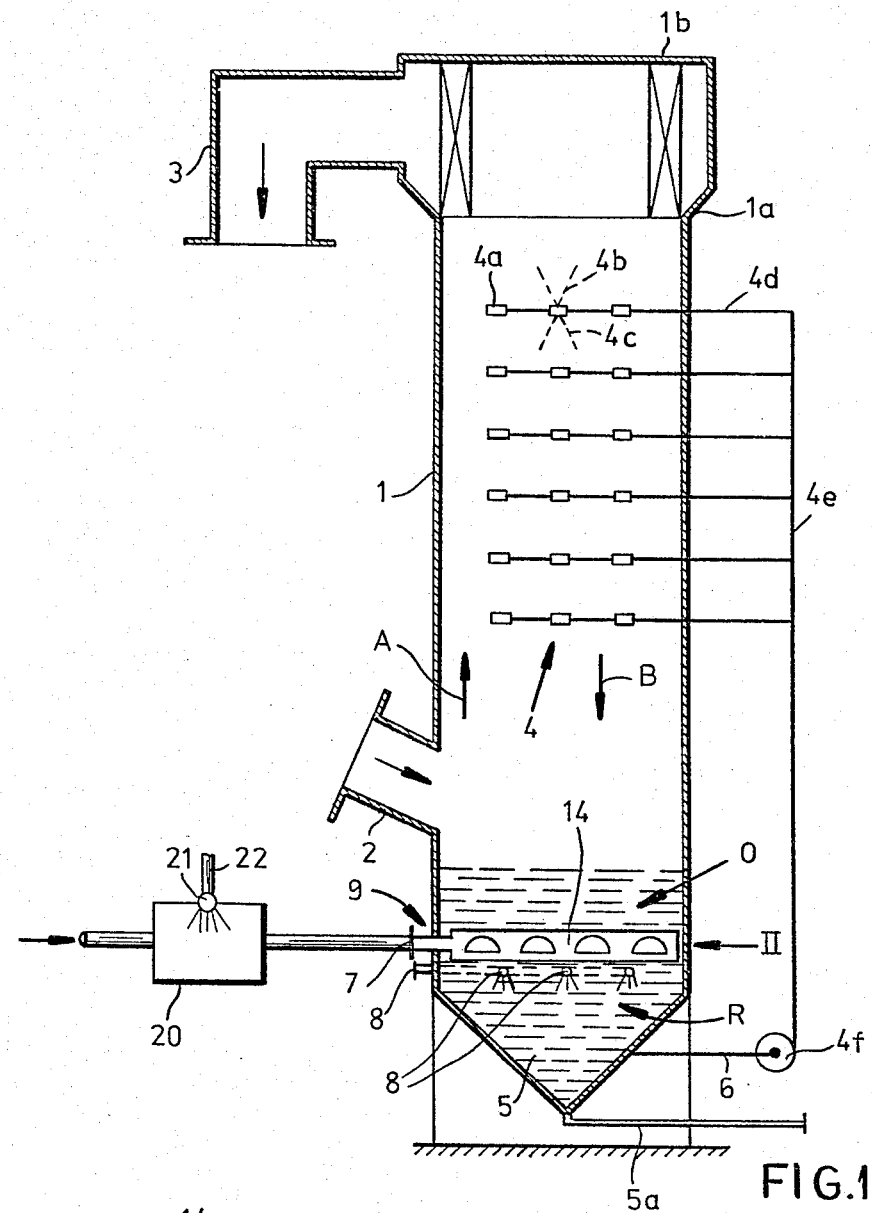
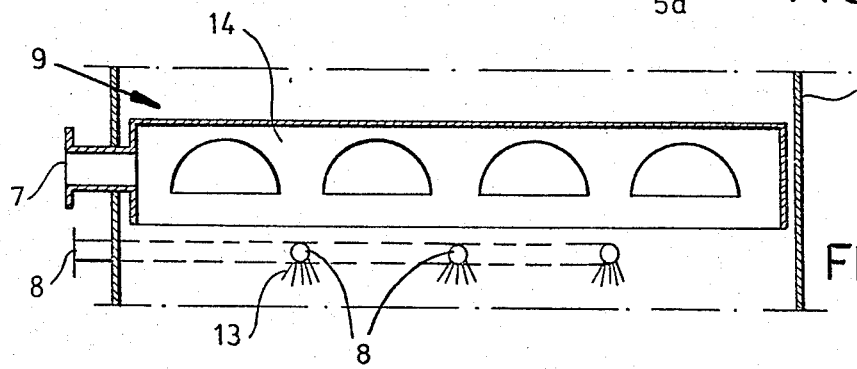
FIG.1
FIG.2

SCRUBBER FOR THE DESULFURIZATION OF EXHAUST GASES

FIELD OF THE INVENTION

My present invention relates to a scrubber for the desulfurization of exhaust gases and, more particularly, to a washing or scrubbing tower forming part of a plant for the removal of sulfur, generally in the form of sulfur compounds, from waste gases before these gases are discharged into the atmosphere.

BACKGROUND OF THE INVENTION

It is known that the release of combustion products, such as the waste gases of a power plant boiler into the atmosphere, may result in environmental pollution to the detriment of the surrounding populace and in violation of regulations and statutes and thus systems have been developed to scrub or wash these gases and to remove sulfur therefrom.

The sulfur present in such cases may be in the form of sulfur dioxide and even sulfur trioxide, or in the form of hydrogen sulfide and even carbon disulfide or like products which are generated to various extents depending on the parameter of the production process.

One approach with the removal of sulfur compounds from such exhaust gases is to scrub them with an aqueous solution into which sulfur-binding compounds can be introduced. The scrubbing is generally effected in a scrubbing tower or column in which the gases pass countercurrent to the scrubbing solution which can be introduced in finely divided form into an upper portion of the column. The lower portion or the sump collects the scrubbing liquid and serving as a site at which solids may precipitate. These solids may include dust scrubbed from the gas and solids formed in the desulfurizing reaction. The decanted scrubbing liquid may be recycled from the sump to sprayers at the upper portion of the column.

Basically, therefore, the scrubber or the washing colum which forms part of a desulfurizing apparatus for the waste or flue gases from the power plant boiler combustion chamber will have a flue gas inlet, a flue gas outlet spaced apart along the height of the column from the inlet, means for introducing the scrubbing liquid between the inlet and the outlet, a sump at the lower part of the column, and means for introducing additives into at least the sump for reaction with the contents thereof.

The additives may be supplied at a higher level for reaction with the gas or in the liquid before these solids in their original or in a dissolved form reach the sump. Since the sulfur binding reaction may be increased by the introduction of oxygen into the system, it has been proposed to provide the sump with oxygen feed pipes.

In general, therefore, the portion of a column above the sump operates primarily or exclusively in an absorption mode, i.e. components which are removed from the gas are taken up by the liquid by solubilization or other absorption or incorporation into the liquid phase.

In general, also, the sulfur is bound in the sump in the form of calcium sulfite and calcium sulfate which can be withdrawn from the sump as sludge, slurry or the like.

The scrubbing liquid generally consists of water to which lime, hydrated lime, slaked lime, limestone, dolomite, chalk or the like has been added.

The decanted scrubbing liquid, containing soluble calcium compounds, can then be recycled to absorb additional quantities of sulfur.

It is not necessary to use pure oxygen in such systems and indeed air or oxygen-enriched air is more common. Nevertheless, when reference is made to the introduction of oxygen in the description of the invention it is intended thereby to include these latter oxygen carriers as well as pure or substantially pure oxygen.

In German patent document DE-OS No. 29 28 061, for example, a scrubbing arrangement of the aforedescribed type has been schematically illustrated without any of the particulars of the geometry whereby the oxygen is supplied.

It has also been pointed out/in *VGB Kraftwerkstechnik* 1981, pages 938–944, where conventional scrubbers for desulfurization purposes are described that the mixtures of calcium sulfate and calcium sulfite which are recovered are proportionally high in calcium sulfite and relatively low in calcium sulfate so that for conversion to gypsum and for use in the building industries, additional steps are required to transform the recovered materials into materials which are more suitable.

OBJECTS OF THE INVENTION

It is the principal object of the present invention to provide an improved scrubber for removal of sulfur from flue gases, especially the flue gases of power plant boiler combustion chambers, whereby disadvantages of earlier systems are avoided.

Another object of this invention is to so form a scrubbing tower that the calcium sulfite/calcium sulfate mixture which is withdrawn has a higher proportion of calcium sulfate and thus can be used directly as construction gypsum or can be modified to form construction gypsum or to serve as construction gypsum economically, simply and with less difficulty.

SUMMARY OF THE INVENTION

These objects and others which will become apparent hereinafter are attained, in accordance with the present invention, in a scrubber having an upper column portion formed with means for treating the gas with a scrubbing liquid to which additives can be supplied to bind the sulfur as a calcium compound, a sump below this upper portion adapted to receive the scrubbing liquid and materials carried thereby and from which the calcium product can be withdrawn, and an oxygen feeder to the sump which is formed as a grate and consists, therefore, of a plurality of spaced-apart mutually parallel bars from which the oxygen is released.

Below this grate, binding calcium additives are fed into the system, the liquid being recycled from the sump to the upper portion of the scrubber.

The invention utilizes my discovery that, when the oxygen feeding pipes are formed as a grate with sufficiently narrow spacing between the pipes, i.e. passages for the liquid between the parallel pipes forming the grate, the grate defines a partition between zones within the sump and these zones primarily function separately.

The upper zone formed above the grate thus serves primarily for oxidation of soluble sulfite to sulfate by reaction with the oxygen which is introduced. In the reaction zone below the grate, the additives can be supplied so that the sulfate can form gypsum which can be precipitated if the pH is raised, for example, by the introduction of alkali or relatively basic substances into this zone.

The horizontal grate thus serves to functionally separate the two zones although it may be noted that some oxidation may continue as the liquid passes through the gas between the oxygen supply pipes into the reaction zone. The product which is thus formed has a high concentration of calcium sulfate and indeed a surprisingly higher concentration of calcium sulfate then can be achieved by simply introducing oxygen at the same level in the sump without subdividing the sump into the oxidation and reaction zones in the manner described.

In a preferred embodiment of the invention, the grate comprises a multiplicity of mutually parallel horizontally spaced downwardly open cylindrically segmental shells or hoods which are provided along their upwardly turned portions with orifices for discharging oxygen into the oxidation zone. These members thus constitute downwardly open, upwardly perforated channels which can be closed along their open sides by liquid which therefore forms a liquid seal.

With respect to the flow velocity of the descending liquid, the rate at which liquid is withdrawn from below the partition in the sump for cycling to the spray devices at the upper portion of the column and the oxygen flow into these channels or troughs, the spacing between the troughs should be such that there is no backflow, i.e. movement of liquid from below the troughs upwardly into the oxidation zone.

Preferably, the device is operated so that an oxygen cushion is maintained in each of the channels and the oxygen pressure is sufficient to prevent liquid from the oxidation zone from penetrating through these orifices to rain into the reaction zone.

The means for feeding the additive into the sump below the grate can comprise pipes having downwardly directed discharge orifices, bores or nozzles. To increase the zone separation effect, the invention can provide the pipes for introducing the additive between the grate members or directly below the gaps between the grate members so that the discharge from these pipes in the downward direction impedes reverse flow of liquid from the reaction zone into the oxidation zone.

Furthermore, since the gaps between the downwardly open channels represent constriction in the flow of the liquid from a zone above the grate to a zone below the grate, the flow velocity increases at this constriction and the distribution of the additive in these regions is rendered more homogeneous because of the increased velocity.

Since there is a column of liquid outside and above the downwardly open troughs in which the oxygen cushion is maintained, the pressure of the gas within the hood may be equal to or about one bar above atmospheric pressure.

It has been found to be advantageous, before the oxygen or oxygen-carrying gas is introduced into the grate to cool it and saturate it with water. This prevents accumulation of deposits at the orifices from which oxygen emanates. It will be appreciated that the liquid films in contact with the surfaces adjacent the orifices tend to greater concentrations of salts and deposit formations from the high salt concentrations of the liquid with the formation of solid crust when cooling and water saturation is not effected, partly because water tends to evaporate into the oxygen streams and leaves the solids behind.

BRIEF DESCRIPTION OF THE DRAWING

The above and other objects, features and advantages of the present invention will become more readily apparent from the following description, reference being made to the accompanying drawing in which:

FIG. 1 is a vertical section through the scrubbing column according to the invention;

FIG. 2 is an enlarged detail view also in section at the region represented at II in FIG. 1;

SPECIFIC DESCRIPTION

Figure 3:
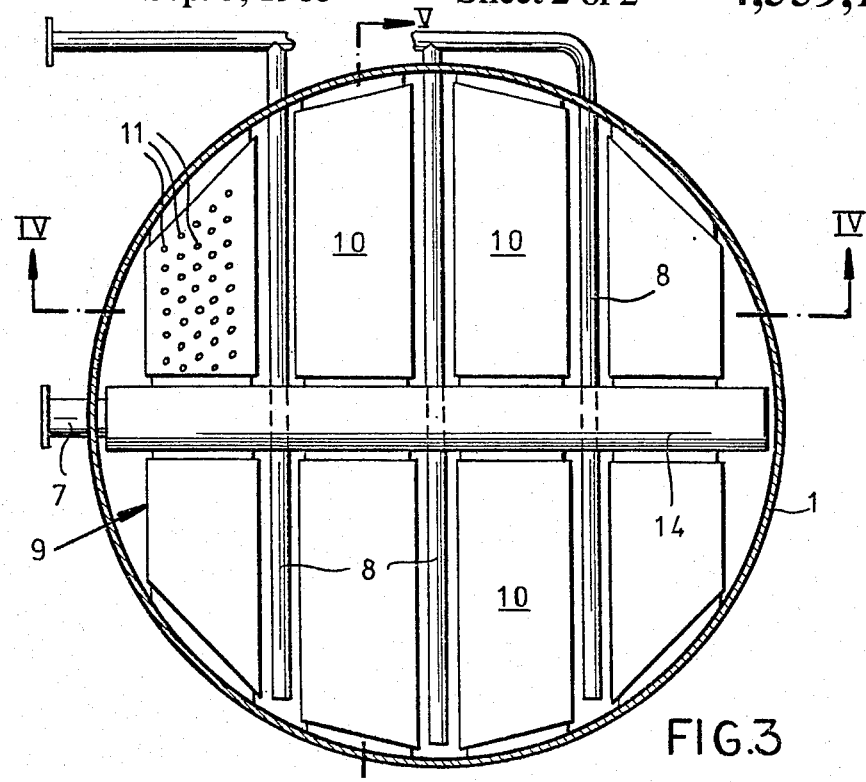
FIG. 3 is a plan view of the region shown in FIG. 2.

The drawing shows a scrubbing column 1 for a flue gas which has been carried off from the combustion chamber of a boiler for an electric power plant, the flue gases containing sulfur generally in the form of sulfur compounds which results from the combustion of sulfur-containing fumes.

The column 1 is provided with an inlet 2 for the flue gas which rises in the direction of arrow A through a scrubbing zone 4 to the head 1a of the column which can be provided with mist or droplet separators represented at 1b and from which the gas outlet 3 extends. The gas outlet 3 can be connected to a filter, a further scrubber or any additional gas purification means to assist for the recovery of valuable currents from the flue gas if desired to a stack for releasing the flue gas into the atmosphere.

The scrubbing zone 4, formed between inlet 2 and the outlet 3, is provided with means for supplying a scrubbing liquid to this zone and the latter means can include a multiplicity of spray nozzles 4a which can spray the scrubbing liquid upwardly and downwardly as represented at 4b and 4c, such arrays of nozzles being shown in vertically spaced relationship. Each such array of nozzles is fed by a pipe 4d and the pipes 4d communicate with a manifold 4e receiving the scrubbing liquid from a pump 4f. The liquid flow, usually in droplet form, is represented by the arrow B.

Below the scrubbing compartment, the column 1 is formed with a sump 5 in which solids can settle. The solids can be withdrawn from the outlets 5a via appropriate means, e.g. a worm, usually in sludge form.

Above the outlet 5a, another outlet 6 for the scrubbing liquid supernatant above the sediment in the sump can be delivered to the pump 4f.

Oxygen or an oxygen-carrying gas can be introduced at 7 while additives, such as lime water, can be introduced at 8.

Above the sump, the column 1 operates as an absorber whereas at the outlet 5a, a mixture of calcium sulfite and calcium sulfate can be recovered.

Upstream of the oxygen inlet 7, a cooler 20 having a spray nozzle 21 supplied by water at 22, is provided to cool the air or other oxygen-carrying gas and saturate it with water for the reasons described.

Figure 4:
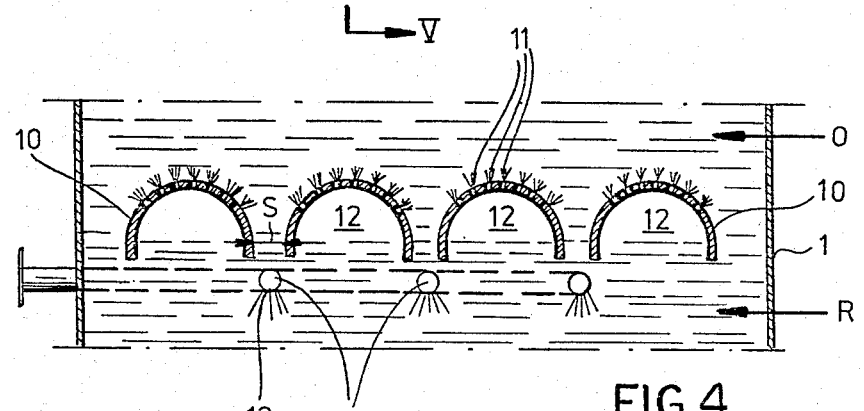
FIG. 4 is a cross sectional view taken along the line IV—IV of FIG. 3.
Figure 5:
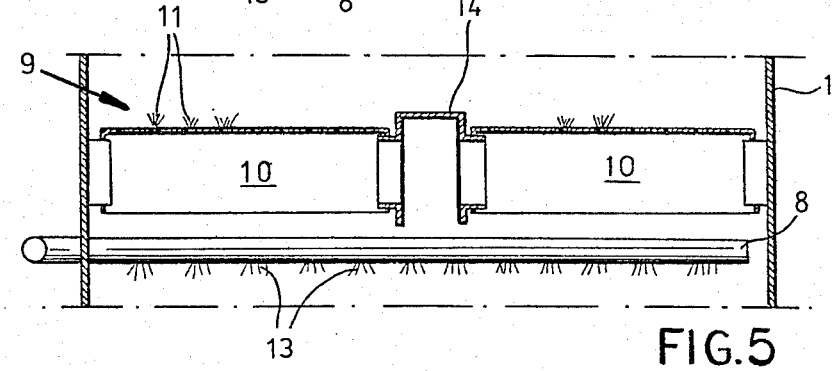
FIG. 5 is a cross-sectional view taken along the line V—V of FIG. 3.

From a comparison of FIGS. 2 and 4, it will be apparent that the sump 5 is subdivided into upper and lower zones O and R, respectively, by a horizontal grate 9 of oxygen supply duct 10. The upper zone O is an oxidation zone whereas the lower zone R is the reaction zone previously mentioned.

Below the grate 9, a device represented generally at 8 is provided for feeding the additive to the scrubbing liquid. In the preferred form the additive can be a calcium hydroxide solution.

According to an important feature of the invention, the grate 9 consists of a multiplicity of downwardly open, upwardly convex hoods or shells which form the ducts 10. Consequently, each of the ducts 10 is open downwardly over its full width. Furthermore, the convex surface of each duct is provided with apertures or orifices 11 for discharging oxygen into the oxidation zone O. The spacing S between the oxygen ducts 10 is selected so that backflow from the reaction zone R to the oxidation zone O is precluded.

Each of the ducts 10, which has the configuration of a downwardly open hood or channel, contains an oxygen cushion 12 so that scrubbing liquid from the oxidation zone O cannot rain through the orifices into the reaction zone R. The additive feeder 8 comprises downwardly directed discharge orifices or nozzles 13 which are located directly below the gaps between the oxygen ducts.

In the conventional manner, flue gases containing sulfur dioxide or sulfur trioxide are scrubbed in region 4 from the flue gas using the scrubbing liquid circulated by the pump 4f from the sump 5 and to which the sulfur bonding additive, e.g. lime, has previously been added to maintain an elevated pH value of the scrubbing liquid such that calcium and calcium sulfite are precipitated.

In general, the sulfur compounds are trapped in the form of sulfite which is reacted in the oxidation zone O to form the sulfate. When the scrubbing liquid accumulates in the sump below the grate, the precipitation reaction can ensue. Preferably, oxidation of the sulfite is effected in the oxidation zone at pH between 4 an 6.5, the acid condition being contributed by the acid components of the flue gas. In any case, the pH in the oxidation zone should be above 7.

In the reaction zone, where the pH is significantly higher as a result of the introduction of additives, the reaction product primarily in the form of gypsum is precipitated out and the solid product withdrawn at the sump has a surprisingly low concentration of calcium sulfite or, put otherwise, a level of calcium sulfate such that the product can be used directly as construction gypsum without problems which have hitherto been encountered because of the high levels of calcium sulfite in the sump products of other scrubber systems.

In the scrubbing column of the invention, the grate 9 is formed so that it constitutes a partition in the manner described and thus the elements forming the grate must be comparatively large, at least in cross section in the flow direction, with respect to the free cross section between these elements.

As a consequence, the downwardly flowing liquid is accelerated through the gaps between the oxygen ducts and the velocity of the liquid is increased by injecting the additive downwardly.

Oxygen bubbles are held close to the ducts by the high downward velocity and generate a forced stirring in the oxidation zone, thereby promoting the oxidation step.

Since the channels 10 are open downwardly, no sludge accumulation can occur therein. The oxygen supply is effected through a central feed passage 14. In practice, the holes 10 can have a width of about 1 meter while the spacing between them can be 0.5 meters or less and, in general, the additive can be diluted with water which can constitute make-up water or water recycled in the system.

While the scrubber has been described primarily for the desulfurizing of flue gas downstream of a boiler combustion chamber, it can, of course, be used whereever desulfurizing of a gas is required.

I claim:

1. A scrubber for removing sulfur compounds from a gas, comprising:

a vertically extending column having a lower portion and an upper portion, inlet means connected and communicating with said lower portion for feeding sulfur bearing gases to said column, said sulfur bearing gases passing into said upper portion, outlet means connected to and communicating with said upper portion for discharging the scrubbed gas;

means in said upper portion of said column for contacting said sulfur bearing gases with a scrubbing liquid containing a sulfur-binding substance whereby a scrubbing liquid containing sulfur compounds descends in said column through said lower portion;

means forming a sump in said lower portion of said column for collecting the scrubbing liquid, said sump being provided with an outlet for a sump product consisting primarily of calcium sulfate;

a grate formed by a multiplicity of mutually parallel closely spaced oxygen-inlet ducts formed in said sump and subdividing said sump into an oxidation zone above said grate wherein oxygen from said ducts reacts sulfite in the liquid in said oxidation zone to form sulfate and into a reaction zone below said grate where said sulfate is precipitated out as calcium sulfate in said product, said ducts being downwardly open upwardly convex hoods supplied via oxygen supply means and formed with upwardly directed orifices for discharging oxygen into the liquid in said oxidation zone, the spacing between said hoods being sufficiently limited to prevent backflow from said reaction zone to said oxidation zone, said inlet for said gas being located below said means for contacting but above said sump, said outlet for said gas being located above said means for contacting; and means for introducing an additive into said reaction zone below said grate for inducing the precipitation of the sulfate from said liquid as the calcium sulfate of said product.

2. The scrubber defined in claim 1, further comprising means for cooling and saturating the oxygen with water before admitting the oxygen into said ducts.

3. The scrubber defined in claim 1 wherein said hoods are constructed to maintain respective oxygen cushions therein preventing passage of liquid from said oxidation zone through said orifices.

4. The scrubber defined in claim 3 wherein the means for introducing said additive into said reaction zone includes a plurality of passages disposed below said grate and trained downwardly.

5. The scrubber defined in claim 4 wherein said passages are disposed in rows directly below gaps between said ducts.

6. The scrubber defined in claim 5, further comprising means for cooling and saturating the oxygen with water before admitting the oxygen into said ducts.

7. The scrubber defined in claim 3, further comprising means for cooling and saturating the oxygen with water before admitting the oxygen into said ducts.

8. The scrubber defined in claim 4, further comprising means for cooling and saturating the oxygen with water before admitting the oxygen into said ducts.

9. The scrubber defined in claim 1 wherein the means for introducing said additive into said reaction zone includes a plurality of passages disposed below said grate and trained downwardly.

10. The scrubber defined in claim 9 wherein said passages are disposed in rows directly below gaps between said ducts.

11. The scrubber defined in claim 9, further comprising means for cooling and saturating the oxygen with water before admitting the oxygen into said ducts.

12. The scrubber defined in claim 10, further comprising means for cooling and saturating the oxygen with water before admitting the oxygen into said ducts.

* * * * *